United States Patent [19]

Buchanan

[11] 3,912,947

[45] Oct. 14, 1975

[54] MOS DATA BUS CONTROL CIRCUITRY

[75] Inventor: John K. Buchanan, Tempe, Ariz.

[73] Assignee: Motorola, Inc., Chicago, Ill.

[22] Filed: July 5, 1974

[21] Appl. No.: 485,698

[52] U.S. Cl. ................ 307/269; 307/205; 307/209; 307/214; 307/215; 307/270; 340/173 AM

[51] Int. Cl.$^2$.. H03K 19/08; H03K 5/13; G06F 7/00

[58] Field of Search ........... 307/209, 205, 251, 265, 307/270, 269; 340/173 R, 173 AM

[56] References Cited

UNITED STATES PATENTS

| | | | |
|---|---|---|---|
| 3,543,166 | 11/1970 | Rabinowitz | 307/269 X |
| 3,840,815 | 10/1974 | Masters | 307/265 X |

OTHER PUBLICATIONS

Femling, "Tri–State Logic in Modular Systems," National Semiconductor Corporation, 4/1971, 14 pgs.

*Primary Examiner*—John S. Heyman
*Assistant Examiner*—L. N. Anagnos
*Attorney, Agent, or Firm*—Vincent J. Rauner; Charles R. Hoffman

[57] ABSTRACT

An MOS micro-processor circuit includes an output circuit which provides data internally generated during a particular clock pulse during a write cycle. A control signal enables the output circuit to maintain data at a valid logic level at the output after the end of said clock pulse. The output is controlled to provide a very high output impedance at the output except during said clock time or during said control signal. The circuit includes two two-input NOR gates cascaded and having a common enable input generated by an enable circuit. The enable circuit has as inputs the control signal and the output of read/write circuitry and generates a signal which enables the NOR gates during a write cycle or during the control signal. The input of the first NOR gate is coupled to a circuit generating an internal data signal.

13 Claims, 4 Drawing Figures

MOS DATA BUS CONTROL CIRCUITRY

BACKGROUND OF THE INVENTION

Micro-processors have been implemented on semiconductor integrated circuit chips using both bipolar and MOS technologies. Such micro-processor chips may perform the functions of accepting and executing instructions presented on bidirectional data input/output conductors. In the process of executing the instructions, output data may be generated on the bidirectional data lines by the micro-processor chip and memory addresses may be provided on other output conductors. For various system requirements, a variety of different types of random access memories (RAMs) and/or read only memories (ROMs) may be required based on cost, speed requirements, etc. The output data generated by a micro-processor chip is typically generated during a particular system clock pulse. The output data is normally valid only during such a clock pulse. However, the varying timing requirements of the data input pulse of the various RAMs or ROMs which may be interfaced with the micro-processor to implement a particular system may vary greatly, and be somewhat incompatible with the time during which valid output data is presented by the micro-processor chip. This characteristic of known micro-processor chips tends to limit the type of memory which can be interfaced with the micro-processor chips and prevents the system economies which could otherwise be achieved.

The bidirectional data lines are typically driven by so-called TRI-STATE drivers which present a low output impedance to drive the data lines to either a logical 1 or a logical 0 during a write cycle, during a particular clock pulse time thereof, and present a very high impedance at all other times, including during a read cycle, at which time the micro-processor accepts data from memory.

SUMMARY OF THE INVENTION

An object of this invention is to provide an improved micro-processor circuit.

Another object of this invention is to provide a circuit which extends the time during which output data is valid which is generated during a particular clock pulse by an output circuit controlled by said clock pulse.

Another object of this invention is to provide an output circuit for a micro-processor chip capable of producing a TRI-STATE output which is representative of an internally generated data signal coupled thereto, such circuit being enabled by a data enable signal applied to a data enable conductor coupled to said circuit by logic circuitry which provides an enable signal to said circuit during the clock pulse of a write cycle and during the data enable signal during a write cycle.

Briefly described, the invention provides a semiconductor circuit including a first control signal input, a second control signal input, a first conductor adapted to having an output signal coupled thereto, a data conductor adapted to having a data signal applied thereto, and logic circuitry coupled to the first control signal input for generating a control signal comprising data output circuit means coupled to the logic circuitry and to the first conductor and to the data conductor. The data output circuit provides an active device maintaining a logical 1 or a logical 0 on the first conductor during a cycle in which a first signal pulse is applied to the first control signal input responsive to an edge of the second control signal applied to the second control signal input. The data output circuit provides an electrically floating output except during the first signal pulse and the second control signal pulse. A delay circuit may be provided between the second control signal input and a coupling circuit coupling the first conductor to an input of the data output circuit to insure that the data output circuit is enabled before the input data is coupled thereto.

DESCRIPTION OF THE INVENTION

Figure 1:
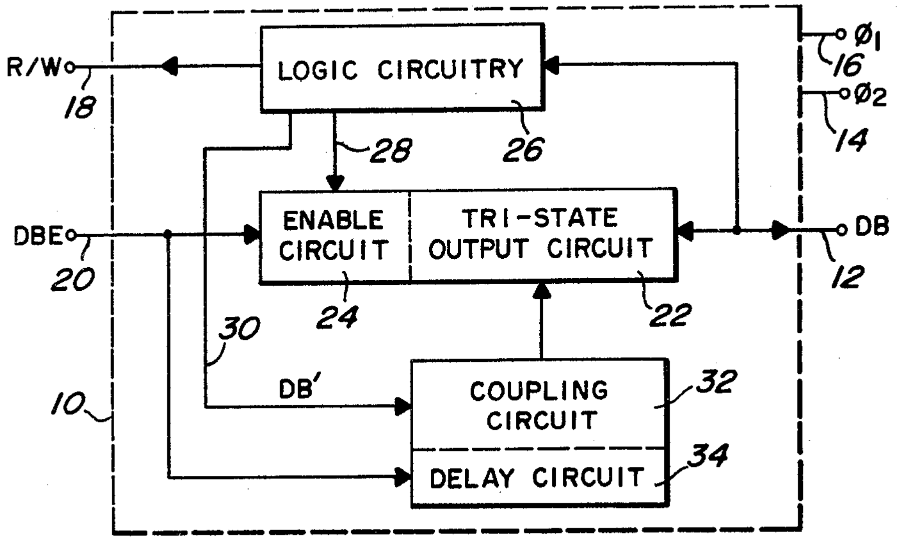
FIG. 1 is a block diagram representing the micro-processor chip and the data output circuit according to the invention.

FIG. 1 is a partial block diagram of an integrated circuit micro-processor unit. The present invention is directed to circuitry for controlling a data bus for micro-processor 10, and those portions of the micro-processor system related to controlling and extending the time during which output data is held valid are shown in the block diagram of FIG. 1. The system is clocked by clock signals $\phi 1$ and $\phi 2$ at clock inputs 14 and 16. A read/write (R/W) signal is generated at output 18 by the micro-processor. A data bus enable (DBE) signal is applied at input 20. Data flows to and from micro-processor 10 on bidirectional data bus 12 (DB). Typically, a micro-processor chip such as micro-processor 10 includes a plurality of bidirectional data buses such as 12, and also includes a plurality of output buses which supply addresses to external memory and also includes other control signal buses, all of which have been omitted from FIG. 1. Data bus 12 is driven by TRI-STATE output circuit 22 which is coupled to and controlled by enable circuit 24. Data controlled and amplified by TRI-STATE output circuit 22 is transferred thereto by coupling circuit 32, which is controlled by delay circuit 34 which controls coupling of data from internal data bus DB′ on line 30. Data is applied to internal data bus DB′ by logic circuitry 26. Enable circuit 24 and delay circuit 34 are controlled by DBE (data bus enable), as is explained subsequently. Logic circuitry 26 accepts instructions from DB and executes them to generate timing and control signals including R/W to control reading or writing into external memory and output data on line 28 which inputs data to enable circuit 24 and TRI-STATE output circuit 22.

Delay circuit 34 creates a delay which allows the signal on line 28 to propagate through enable circuit 24 so as to "enable" TRI-STATE output circuit 22 before data on line 30 (DB′) is coupled to TRI-STATE output circuit 22.

Figure 2:
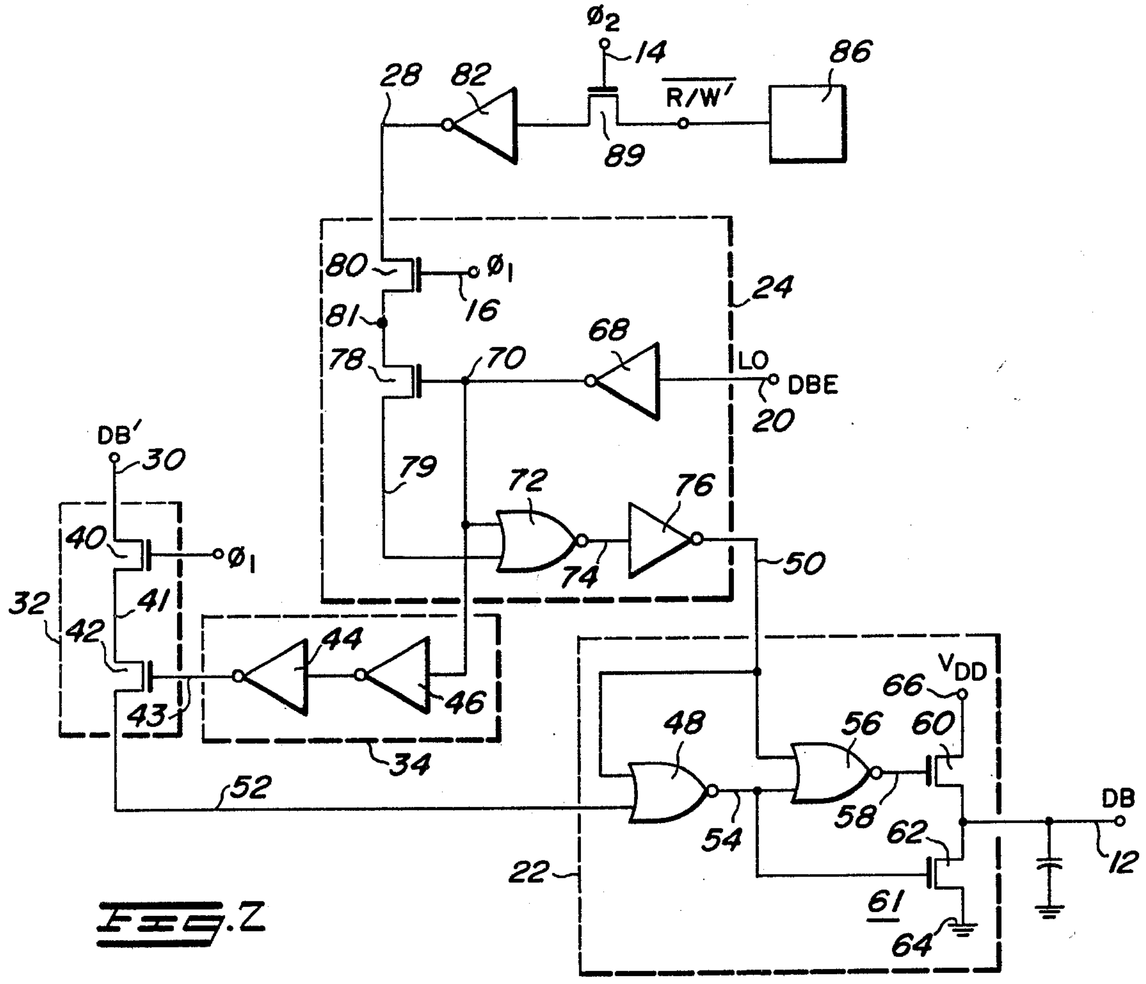
FIG. 2 is a schematic diagram representing circuitry which may be used to implement the system of FIG. 1.
Figure 3:
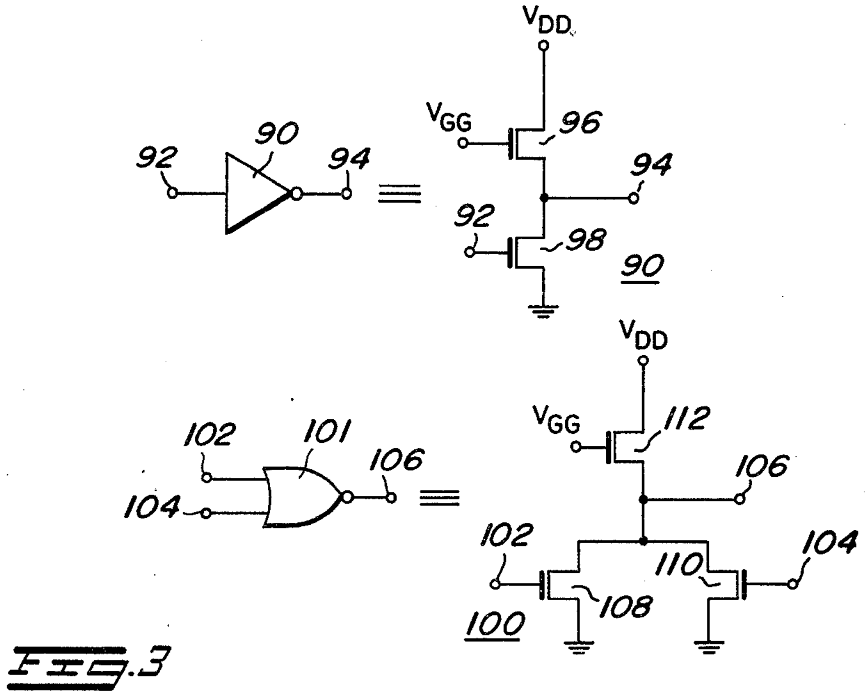
FIG. 3 is a schematic diagram illustrating MOSFET implementations of the circuitry in FIG. 2.

FIG. 2 is a schematic diagram of a particular implementation of the micro-processor shown in the block diagram of FIG. 1. Where appropriate, the same reference numerals have been used. In FIG. 2, coupling circuit 32 MOSFET 40 has its gate connected to $\phi 1$ and is connected between nodes 30 and 41. MOSFET 42 is coupled between nodes 41 and 52 and has its gate connected to node 43. Delay circuit 34 includes inverters 44 and 46 connected in cascade between nodes 43 and 70. Referring to FIG. 3, it is seen that each inverter represented by the conventional logic symbol may include a load MOSFET 96 coupled between $V_{DD}$ and the output, node 94 and a switch MOSFET 98 coupled between ground and the output.

Referring back to FIG. 2, it is seen that TRI-STATE output circuit 22 includes NOR gates 48 and 56 and a push-pull driver circuit including MOSFETs 60 and 62. NOR gate 48 has inputs connected, respectively, to nodes 50 and 52 and has its output connected to node 54. NOR gate 56 has one input connected to node 50 and another input connected to node 54 and has its output connected to node 58. NOR gates 48 and 56 may be implemented by the circuit diagrams indicated in FIG. 3. Pull-up MOSFET 60 is connected between $V_{DD}$ and node 12 (DB) and has its gate connected to node 58. Pull-down MOSFET 62 is connected between node 12 and ground, node 64, and has its gate connected to node 54. Enable circuit 24 includes MOSFETs 78 and 80, inverters 68 and 76, and NOR gate 72. Inverter 68 has its input connected to node 20, DBE, and has its output connected to node 70. MOSFETs 78 and 80 are connected in series between nodes 28 and 79. MOSFET 80 has its gate connected to $\phi 1$ and MOSFET 78 has its gate connected to node 70. NOR gate 72 has one input connected to node 70, another input connected to node 79, and its output connected to node 74. Inverter 76 has its input connected to node 74 and its output connected to node 50. MOSFET 89 and inverter 82 and circuitry 86 may be considered as being included in logic circuitry 26 of FIG. 1, and are included to illustrate that logic circuitry 26 drives node 28 with a signal generated during the previous $\phi 2$ clock pulse controlling whether a read command or a write command to external memory is being generated during the current cycle.

The main purpose of the invention is to extend the "window" during which data is held valid at node 12, DB, before the leading edge of $\phi 2$ and after the trailing edge of $\phi 2$. As mentioned earlier, the data generated and inputted to TRI-STATE circuitry 22 is generated by logic circuitry 26 during $\phi 2$. It is a requirement for a bidirectional data bus supplying data to an external RAM that a driver circuit (here TRI-STATE circuitry 22) provide a low impedance output signal during a write cycle and present a very high impedance during a read cycle. From these two requirements, it is seen that circuitry is required which produces a high impedance (i.e., electrically floating) output during a read cycle and also during any time that DBE is at a logical 0.

As previously mentioned, the main reason that it is desirable to extend the time beyond the leading and trailing edges of $\phi 2$ for holding data valid during a write cycle is to allow interfacing of the micro-processor with external random access memories which may require data to be held valid earlier or later than $\phi 2$. This capability gives the system designer greater flexibility which may lead to system economies or improved system performance.

Figure 4:
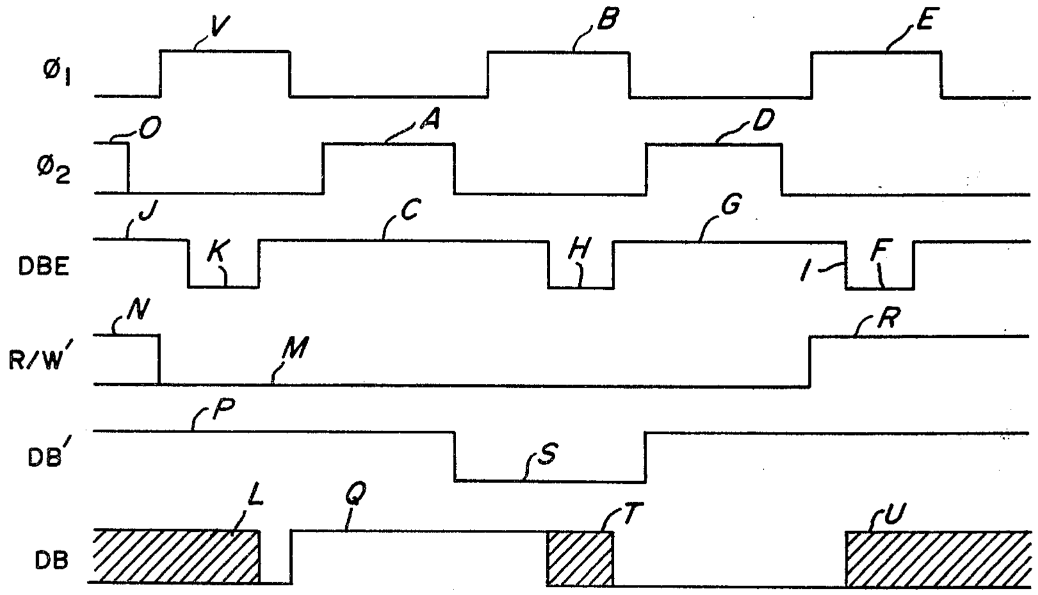
FIG. 4 is a timing diagram useful in explaining the operation of the circuit of FIG. 2.

Referring to FIG. 4, it is seen that the clock signals $\phi 1$ and $\phi 2$ are non-overlapping signals. The positive pulses of the DBE waveform extend somewhat earlier and later than the leading and trailing edges of $\phi 2$. The internally generated signal which indicates whether the following cycle is to be a read cycle or a write cycle, $\overline{R/W}'$, is coupled through MOSFET 89 and inverted by inverter 82 to provide a signal representative of the type of the subsequent cycle at node 28. The operation of the micro-processor is described with reference to FIGS. 2 and 4. Initially, it is seen in FIG. 4 that R/W' is high. This indicates that the micro-processor has been executing a read cycle, i.e., to allow the micro-processor to address an external RAM, send it a read command, and accept data on DB, node 12 without causing loading by driver 61 in FIG. 2. (The external RAM is not shown.) During pulse 0 of $\phi 2$ (FIG. 4) $\overline{R/W}'$ (not shown in FIG. 4) goes high, so that a high signal is coupled through MOSFET 89 to the input of inverter 82, and consequently node 28 is low. During pulse V of $\phi 1$, MOSFET 80 will be turned on establishing a signal R/W' that is low at node 81. This prepares the micro-processor for a write cycle. Since DBE is high, at the level indicated by reference J, node 70 is low, and MOSFET 78 is off. However, when DBE undergoes its transition to level K, node 70 goes high by virtue of the operation of inverter 68, and MOSFET 78 is turned on. The low level on node 81 is thus coupled through MOSFETs 78, to node 79. Consequently, node 74, the output of NOR gate 72 remains low because node 70 is high and node 50, the output of inverter 76 stays high. This, in turn, causes nodes 54 and 58, the outputs of NOR gates 48 and 56, respectively, to stay low, keeping MOSFETs 60 and 62 off, causing driver circuit 61 to remain in the TRI-STATE mode, presenting a very high impedance to node 12, DB. During the rising edge of pulse K, buffer 61 is enabled to transfer data to DB, node 12, in the following manner. When DBE goes high at the end of pulse K, node 70 goes low, and because a low voltage has already been established on node 79, node 74 goes high and node 50 goes low, enabling buffer 61 to transfer data to DB also. During pulse K, data on DB' is transferred through coupling MOSFETs 40 and 42 to node 52 because node 43 is high, since DBE is low. Once DBE goes to level C, MOSFETs 42 and 78 are turned off, which allows the data trapped on node 52 to be continuously stored until the next negative pulse of DBE. When DB' goes from level P to level S, DB remains at level Q until the end of the concurrence of pulses B and C of $\phi 1$ and DBE, respectively, during which time driver circuit 61 is in the write mode. During pulse H the buffer 61 goes into the TRI-STATE mode as indicated by reference letter T, as described above. During T, level S of DB' is transferred to the buffer 61 because DBE has gone low, as described above. Because R/W' has remained low, the information from DB' during S will be transferred to DB during the times that DBE is at level G, which completes another write cycle.

During the subsequent read cycle, R/W' goes to level R, and during pulse F of DBE, node 79 goes high, node 74 goes low, node 50 goes high, and buffer 61 is forced into the TRI-STATE mode.

It is seen that use of the TRI-STATE buffer circuitry 22 controlled by TRI-STATE enable circuitry 24 allows controlling the width of an output pulse on DB, since the trailing edge of an output pulse is controlled by the trailing edge of a positive DBE pulse, delayed by the inverter delays through inverters 68, NOR gate 72, inverter 76 and NOR gates 48 and 56 and driver circuit 61. Thus, the micro-processor chip can be interfaced with an externally connected RAM which requires data to be held valid substantially later than the trailing edge of the $\phi 2$ pulse of the memory write cycle. The circuitry of FIG. 2 described hereinbefore makes this possible. It accomplishes this by means of the unique circuitry including inverter 68, DB input node 20, MOSFET 78, NOR gate 72 and inverter 76 which interact to enable the TRI-STATE circuit so that data on DB is held valid for a period controlled by deleting the trailing edges of DBE. The limit on advancing the leading edge of DBE is set by the requirement that there exist a minimum negative pulse width of DBE coincident with $\phi 1$ to allow coupling of the signal from node 28 to node 79 and to allow coupling of data from node 30 to node 52.

While the invention has been described in relation to a particular embodiment thereof, those skilled in the art will recognize that variations and arrangement of elements of the described embodiment may be made within the scope of the invention.

What is claimed is:

1. A semiconductor circuit including a first control signal input, a second control signal input, a first conductor adapted to having an output signal coupled thereto, a data conductor within said semiconductor circuit adapted to having a data signal applied thereto, and logic circuitry coupled to said first control signal input for generating an internal control signal, said semiconductor circuit comprising data output circuit means coupled to said logic circuitry and to said first conductor and to said data conductor and to said second control signal input for actively holding a data signal on said first conductor during a cycle in which a first signal is applied to said first control signal input in response to an edge of a second control signal applied to said second control signal input.

2. A semiconductor circuit including a first control signal input, a second control signal input, a first conductor adapted to having an output signal coupled thereto, a data conductor within said semiconductor circuit adapted to having a data signal applied thereto, and logic circuitry coupled to said first control signal input for generating an internal control signal, said semiconductor circuit comprising data output circuit means coupled to said logic circuitry and to said first conductor and to said data conductor and to said second control signal input for actively holding a data signal on said first conductor during a cycle in which a first signal is applied to said first control signal input in response to an edge of a second control signal applied to said second control signal input and for allowing said first conductor to electrically float except during coincidence of said first control signal and said second control signal.

3. The semiconductor circuit as recited in claim 2 further including delay circuit means coupled between said second control signal input and said data output circuit means for controlling coupling of said data signal to said data output circuit means so that said first conductor is allowed to electrically float before said data signal is coupled to said data output circuit means, in response to a signal applied to said second control signal input.

4. The semiconductor circuit as recited in claim 2 wherein said data output circuit means includes MOS output driver circuit means coupled to said first conductor for holding a logical 1 or a logical 0 level on said first conductor or allowing said first conductor to electrically float, in response to signals on said first control signal input, said second control signal input or said data conductor.

5. The semiconductor circuit as recited in claim 4 wherein said MOS output driver circuit means includes a pull-up MOSFET coupled between a first voltage conductor and said first conductor having its gate connected to other circuitry also in said data output circuit means and a pull-down MOSFET coupled between said first conductor and a second voltage conductor having its gate connected to said other circuitry.

6. The semiconductor circuit as recited in claim 5 wherein said other circuitry includes first and second MOSFET NOR gates, said first and second MOSFET NOR gates each having an input connected to a common node, said first MOSFET NOR gate having an input coupled to said data conductor by coupling circuit means and having its output connected to an input of said second MOSFET NOR gate and to said pull-down MOSFET, said second MOSFET NOR gate having its output connected to the gate of said pull-up MOSFET.

7. The semiconductor circuit as recited in claim 6 including an inverter having an input coupled to said second control signal input, a coupling MOSFET having one main electrode coupled to said logic circuitry and having its gate connected to the output of said inverter and having its other main electrode connected to an input of a NOR gate, said NOR gate having its other input connected to the output of said inverter and having its output connected to an input of a second inverter, said second inverter having its output connected to said node.

8. A semiconductor circuit as recited in claim 7 further including a delay circuit including two cascaded inverters coupled between an enable circuit of said semiconductor circuit and a gate electrode of said second coupling MOSFET coupling said second input of said first MOSFET NOR gate and said second data conductor, said enable circuit being coupled to said second control signal input and said logic circuitry.

9. The semiconductor circuit as recited in claim 2 wherein said logic circuitry also generates said data signal in response to an input signal applied to said first conductor.

10. A semiconductor circuit comprising:

- logic circuitry means coupled to a first control signal input for generating a read/write signal at a first node;
- a first MOSFET having a gate connected to a first clock input coupling said first node to a second node;
- a second MOSFET coupling said second node to a third node, said second MOSFET having its gate connected to a fourth node;
- a first NOR gate having two inputs connected, respectively, to said third and fourth nodes and having an output connected to a fifth node;
- a first inverter having an input connected to said fifth node and an output connected to a sixth node;
- a TRI-STATE output circuit having an input connected to said sixth node and also having an output node; and
- a coupling circuit coupling an internal data conductor to another input of said TRI-STATE output circuit, said internal data conductor being coupled to said logic circuitry means for having a control signal generated thereon by said logic circuitry means, said TRI-STATE output circuit being a circuit for providing a high output impedance corresponding to one configuration of said inputs of said TRISTATE output circuit and for providing a low output impedance during another voltage configuration of said inputs of said TRI-STATE output circuit.

11. The semiconductor circuit as recited in claim 10 wherein said coupling circuit includes a third MOSFET coupling said internal data conductor to a seventh node having a gate connected to said first clock input and further includes a fourth MOSFET coupling said seventh node to said other input of said TRI-STATE circuit, said fourth MOSFET having a gate connected to a control circuit in said semiconductor circuit.

12. The semiconductor circuit as recited in claim 11 wherein said control circuit includes a delay circuit having an input connected to said fourth node.

13. The semiconductor circuit as recited in claim 10 wherein said semiconductor circuit is part of an integrated circuit micro-processor chip.

* * * * *